Patented Feb. 18, 1930

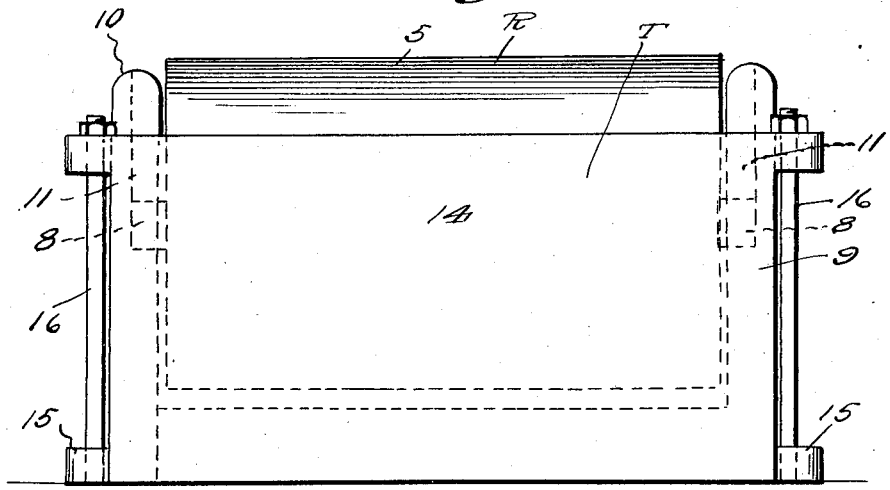
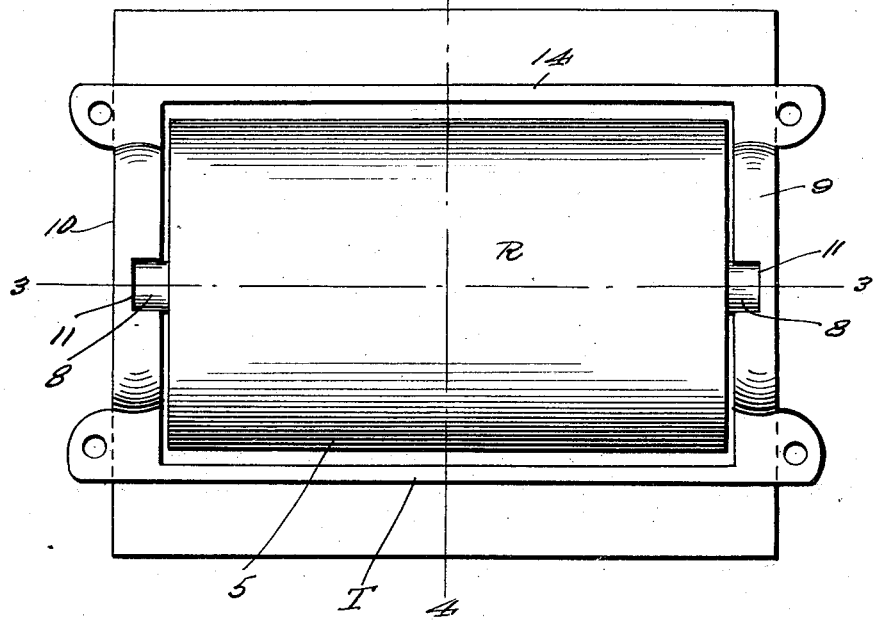

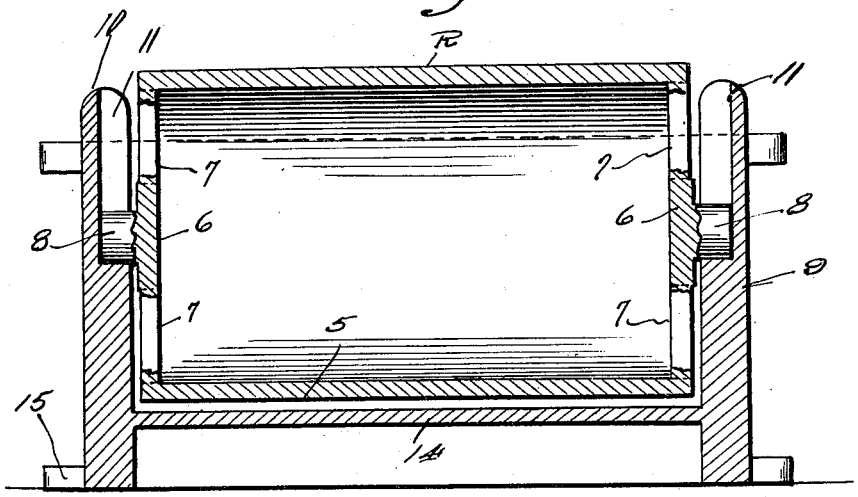
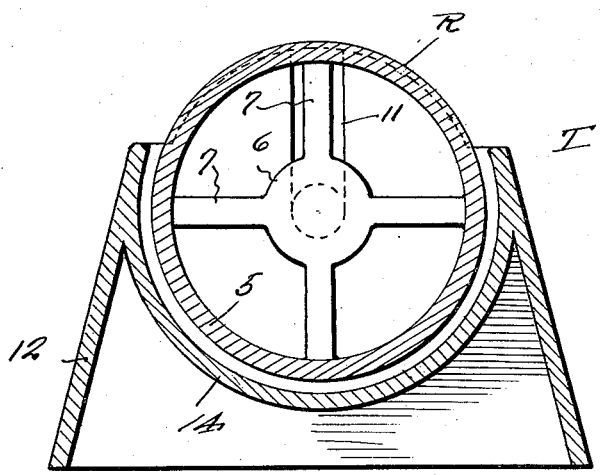

1,747,597

UNITED STATES PATENT OFFICE

KLAAS PHEIFER, OF PLATTE, SOUTH DAKOTA

HOG OILER

Application filed April 5, 1929. Serial No. 352,836.

The present invention relates to hog oilers of the class used by stock raisers for destroying vermin on animals by permitting them to rub themselves on a surface coated with oil of a quality suited to the purpose, and the objects of my improvement are to provide a roller journaled in a horizontal position to turn freely in bearings and in a trough centered thereunder containing oil that the surface of the roller may be coated with oil it may be turned by means of the contact of the animal therewith; to provide the roller or hollow cylinder with open ends to permit access for cleaning its interior and also to prevent displacement of so much oil in the trough, and to provide simple and durable construction and assemblage of the various members for securely facilitating operation and affording efficiency of action.

With the above and numerous other objects in view as will appear as the description proceeds, the invention resides in certain novel features of construction, and in the combination and arrangement of parts as will be hereinafter more fully described and claimed.

These objects may be obtained in the following described manner as illustrated in the accompanying drawings, in which:

Figure 1 is a side elevation of the hog oiler embodying the features of my invention, Figure 2 is a top plan view thereof, Figure 3 is a longitudinal vertical section therethrough taken substantially on the line 3—3 of Figure 2, and Figure 4 is a vertical transverse section therethrough taken substantially on the line 4—4 of Figure 2.

Referring to the drawing in detail it will be seen that the roller is denoted generally by the letter R and the trough generally by the letter T. The roller R comprises a cylindrical body 5 having open ends in which are disposed hubs 6 with radiating spokes 7 merging into the end edges of the cylindrical body 5.

Outwardly directed from the hubs are pintles 8. The trough T comprises a pair of end walls 9 which taper upwardly in width and on their upper ends are provided with extensions 10 having an arcuate upper edge. These extensions 10 and walls 9 are provided with vertical grooves 11, the bottom ends of which function as journals for the pintles 8. Thus it will be seen that the roller R may be easily taken from or disposed in the trough.

The trough T further comprises side walls 12 extending between the end walls and formed integral with the upright edges thereof so that said side walls 12 diverge away from each other downwardly. An arcuate body 14 is substantially semi-cylindrical in formation and is disposed with its axis coincident with the axis of the cylinder 5 and in parallelism to the side walls 5 and therefore at right angles to the end walls 9.

Apertured ears 15 project outwardly from the end walls 9 at the bottom and top edges thereof and the bottom ears are in alinement with corresponding upper ears so that bolts 16 from a platform or the like may be passed through the ears to firmly secure the boiler in place.

In operation, suitable oil may be placed in the trough to its nearly full capacity as the hollow cylinder 5 will not displace much of its contents. The animals in rubbing or scratching themselves across the cylinder wall causes a turn thus keeping its surface coated with oil from the trough which adheres by contact with the animal to destroy the vermin and thereby preserve its health. For the convenience of cleaning and for shipping, the cylinders are easily removable from the trough and the trough is easily removable from its support.

It is thought that the construction, utility and advantages of this invention will now be quite apparent to those skilled in this art without a more detailed description thereof.

It will be noted that the trough is an integral casting and therefore may be manufactured at a low cost. However, the present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A hog oiler of the class described comprising a trough in the form of an integral casket including end walls with side walls extending therebetween and a semi-cylindrical bottom between the end walls and the side walls, and a roller comprising a hollow open ended cylinder with spoke structures in the end thereof and pintles extending from the spoke structure and journaled in the end wall, the inner surfaces of the end wall being provided with vertical grooves, the bottoms of which function as bearings for said pintles, the side walls of said trough diverging downwardly from each other, a pair of ears projecting outwardly from the upper edge of each end wall and a pair of ears projecting outwardly from the lower edge of each end wall, said ears being apertured to receive supporting bolts from a platform, said end walls having upwardly directed extensions with arcuate upper edges, and said grooves being extended with said extensions.

In testimony whereof I affix my signature.

KLAAS PHEIFER.